(12) United States Patent
Sugiyama et al.

(10) Patent No.: US 9,007,001 B2
(45) Date of Patent: Apr. 14, 2015

(54) POWER SUPPLY SYSTEM AND VEHICLE EQUIPPED WITH POWER SUPPLY SYSTEM

(75) Inventors: Yoshinobu Sugiyama, Toyota (JP); Wanleng Ang, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 4 days.

(21) Appl. No.: 13/640,376

(22) PCT Filed: Apr. 7, 2011

(86) PCT No.: PCT/IB2011/000758
§ 371 (c)(1),
(2), (4) Date: Nov. 30, 2012

(87) PCT Pub. No.: WO2011/128750
PCT Pub. Date: Oct. 20, 2011

(65) Prior Publication Data
US 2013/0134908 A1    May 30, 2013

(30) Foreign Application Priority Data

Apr. 14, 2010   (JP) .................................. 2010-093250

(51) Int. Cl.
H02P 1/00      (2006.01)
B60L 11/18    (2006.01)
(Continued)

(52) U.S. Cl.
CPC ............. B60L 11/1816 (2013.01); B60L 11/14 (2013.01); B60L 11/1803 (2013.01);
(Continued)

(58) Field of Classification Search
USPC .................. 320/104, 118, 119, 140; 318/139; 307/9.1; 701/22
See application file for complete search history.

(56) References Cited

U.S. PATENT DOCUMENTS 5,796,175 A * 8/1998 Itoh et al. ..................... 307/10.1
8,035,247 B2 * 10/2011 Ichikawa ..................... 307/10.1
(Continued)

FOREIGN PATENT DOCUMENTS

EP    2 169 802 A1    3/2010
EP    2 255 990 A1    12/2010
(Continued)

OTHER PUBLICATIONS

Frank Cathell, Increasing Low Power Converter efficiency with Resonant snubbers, May 2008, ON Semiconductor, pp. 1-4.*
(Continued)

*Primary Examiner* — Rina Duda
*Assistant Examiner* — Bickey Dhakal
(74) *Attorney, Agent, or Firm* — Oliff PLC

(57) ABSTRACT

A power supply system includes: a first electrical storage device; a charging device charging the first electrical storage device with external power from an external power supply; a second electrical storage device supplying an auxiliary load with a voltage lower than an output voltage of the first electrical storage device; a first converter stepping down a voltage of power from the first electrical storage device and supplying the auxiliary load and the second electrical storage device with a voltage; a second converter having a capacity smaller than that of the first converter and charging the second electrical storage device with the external power; and a controller, when the external power is charged, controlling charging power from the charging device to the first electrical storage device and charging power from the second converter to the second electrical storage device based on a state of charge of the second electrical storage device.

21 Claims, 9 Drawing Sheets

(51) Int. Cl.
  *B60L 11/14* (2006.01)
  *H02J 7/00* (2006.01)
  *H02J 7/02* (2006.01)

(52) U.S. Cl.
  CPC ........ *B60L 11/1861* (2013.01); *B60L 11/1887* (2013.01); *B60L 2210/10* (2013.01); *B60L 2210/30* (2013.01); *B60L 2220/14* (2013.01); *Y02T 10/7044* (2013.01); *Y02T 10/705* (2013.01); *Y02T 10/7077* (2013.01); *Y02T 10/7216* (2013.01); *Y02T 10/7241* (2013.01); *Y02T 90/127* (2013.01); *Y02T 90/14* (2013.01); *Y02T 90/34* (2013.01); *H02J 7/0054* (2013.01); *H02J 7/0055* (2013.01); *H02J 7/0073* (2013.01); *H02J 7/022* (2013.01); *Y02T 10/70* (2013.01)

(56) References Cited

U.S. PATENT DOCUMENTS

| | | | | |
|---|---|---|---|---|
| 2009/0039831 | A1* | 2/2009 | Ichikawa | 320/118 |
| 2010/0019723 | A1* | 1/2010 | Ichikawa | 320/109 |
| 2010/0019729 | A1* | 1/2010 | Kaita et al. | 320/134 |
| 2010/0141213 | A1* | 6/2010 | Iida | 320/134 |
| 2010/0217466 | A1* | 8/2010 | Ichikawa | 701/22 |
| 2011/0187184 | A1 | 8/2011 | Ichikawa | |

FOREIGN PATENT DOCUMENTS

| | | |
|---|---|---|
| JP | A-4-325801 | 11/1992 |
| JP | A-7-15807 | 1/1995 |
| JP | A-11-164409 | 6/1999 |
| JP | A-2002-262474 | 9/2002 |
| JP | A-2009-27774 | 2/2009 |
| JP | A-2011-55682 | 3/2011 |
| JP | B2-4984010 | 7/2012 |
| WO | WO 2009/116311 A1 | 9/2009 |
| WO | WO 2011/016134 A1 | 2/2011 |
| WO | WO 2011/024285 A1 | 3/2011 |
| WO | WO 2011/036758 A1 | 3/2011 |

OTHER PUBLICATIONS

Jan. 25, 2012 Japanese Office Action issued in Japanese Patent Application No. 2010-093250 (with translation).

* cited by examiner

POWER SUPPLY SYSTEM AND VEHICLE EQUIPPED WITH POWER SUPPLY SYSTEM

BACKGROUND OF THE INVENTION

1. Field of the Invention

The invention relates to a power supply system and a vehicle equipped with the power supply system and, more particularly, to charging control for charging an electrical storage device equipped for a vehicle with electric power supplied from an external power supply.

2. Description of the Related Art

In recent years, as an environmentally friendly vehicle, an electromotive vehicle that is equipped with an electrical storage device (for example, a secondary battery, a capacitor, or the like) and that is propelled by driving force generated from electric power stored in the electrical storage device receives attention. The electromotive vehicle, for example, includes an electric vehicle, a hybrid vehicle, a fuel cell vehicle, and the like. Then, there is proposed a technique for charging electrical storage devices equipped for these electromotive vehicles by a commercial power supply having a high power generation efficiency.

There is known a hybrid vehicle that is able to charge an in-vehicle electrical storage device from a power supply (hereinafter, also simply referred to as "external power supply") outside the vehicle (hereinafter, also simply referred to as "external charging") as in the case of an electric vehicle. For example, there is known a so-called plug-in hybrid vehicle that is able to charge an electrical storage device using a power supply of an ordinary household in such a manner that a power supply wall outlet installed in a house is connected to a charging inlet provided for a vehicle via a charging cable. By so doing, it may be expected to improve the fuel consumption efficiency of the hybrid vehicle.

Japanese Patent Application Publication No. 2009-027774 (JP-A-2009-027774) describes a technique for, in a vehicle equipped with a battery that allows external charging, continuously operating a DC/DC converter, which is used to step down the voltage of the battery to drive auxiliary loads and charge an auxiliary battery, during operation of the vehicle and intermittently operating the DC/DC converter during external charging.

With the technique described in JP-A-2009-027774, in comparison with a case where the DC/DC converter is constantly driven during external charging, a loss at the time of power conversion carried out by the DC/DC converter may be reduced through intermittent operation, so it is possible to improve the charging efficiency.

Such a DC/DC converter not only charges the auxiliary battery but also drives all the auxiliary loads of the vehicle during operation of the vehicle, so a relatively high-power DC/DC converter is employed.

However, during external charging, a smaller number of auxiliary loads are driven as compared with that during operation of the vehicle, so driving the DC/DC converter may exhibit excessive performance. In such a case, the power conversion efficiency of the DC/DC converter becomes poor because of low-power power conversion.

SUMMARY OF INVENTION

The invention provides a power supply system that may be charged by an external power supply and that suppresses a decrease in charging efficiency during external charging, and a vehicle equipped with the power supply system.

A first aspect of the invention provides a power supply system. The power supply system includes: a first electrical storage device; a charging device that charges the first electrical storage device with electric power supplied from an external power supply; a second electrical storage device that supplies an auxiliary load with a power supply voltage lower than an output voltage of the first electrical storage device; a first converter that steps down a voltage of electric power supplied from the first electrical storage device and that supplies a power supply voltage to the auxiliary load and the second electrical storage device; a second converter that has a capacity smaller than that of the first converter and that uses the electric power supplied from the external power supply to charge the second electrical storage device; and a controller that, when electric power is charged from the external power supply, controls charging electric power from the charging device to the first electrical storage device and charging electric power from the second converter to the second electrical storage device on the basis of a state of charge of the second electrical storage device.

When it is required to charge the second electrical storage device, the controller may set the charging electric power to the first electrical storage device and the charging electric power to the second electrical storage device so that the second electrical storage device is more preferentially charged than the first electrical storage device is charged.

When electric power is charged from the external power supply, the controller may use the second converter to charge the second electrical storage device before causing the charging device to start charging the first electrical storage device.

When the state of charge of the second electrical storage device is higher than or equal to a reference value that indicates a full charge, the controller may decrease the charging electric power to the second electrical storage device and may use the charging device to start charging the first electrical storage device.

When the state of charge of the second electrical storage device is lower than or equal to a second threshold that is higher than a first threshold at or below which the first converter is required to be driven, the controller may decrease the charging electric power to the first electrical storage device and may use the second converter to increase the charging electric power to the second electrical storage device.

When the state of charge of the second electrical storage device is lower than or equal to a first threshold at or below which the first converter is required to be driven, the controller may use the first converter to charge the second electrical storage device.

The first converter may have such a characteristic that an operation efficiency of the first converter decreases when an output power of the first converter decreases below a reference value.

The second converter may be an AC/DC converter that converts alternating-current electric power supplied from the external power supply to direct-current electric power.

The charging device may include a rectifier circuit that rectifies alternating-current electric power supplied from the external power supply to direct-current electric power, and the second converter may be a DC/DC converter that converts direct-current voltage rectified by the rectifier circuit.

A second aspect of the invention provides a vehicle. The vehicle includes: a first electrical storage device; a driving device that generates driving force for propelling the vehicle with electric power supplied from the first electrical storage device; a charging device that charges the first electrical storage device with electric power supplied from an external power supply; an auxiliary load; a second electrical storage device that supplies an auxiliary load with a power supply voltage lower than an output voltage of the first electrical storage device; a first converter that steps down a voltage of electric power supplied from the first electrical storage device and that supplies a power supply voltage to the auxiliary load and the second electrical storage device; a second converter that has a capacity smaller than that of the first converter and that uses the electric power supplied from the external power supply to charge the second electrical storage device; and a controller that, when electric power is charged from the external power supply, controls charging electric power from the charging device to the first electrical storage device and charging electric power from the second converter to the second electrical storage device on the basis of a state of charge of the second electrical storage device.

According to the aspects of the invention, in the vehicle power supply system that is chargeable by an external power supply, it is possible to suppress a decrease in charging efficiency during external charging.

BRIEF DESCRIPTION OF DRAWINGS

The features, advantages, and technical and industrial significance of this invention will be described below with reference to the accompanying drawings, in which like numerals denote like elements, and wherein.

DETAILED DESCRIPTION OF EMBODIMENTS

Figure 1:
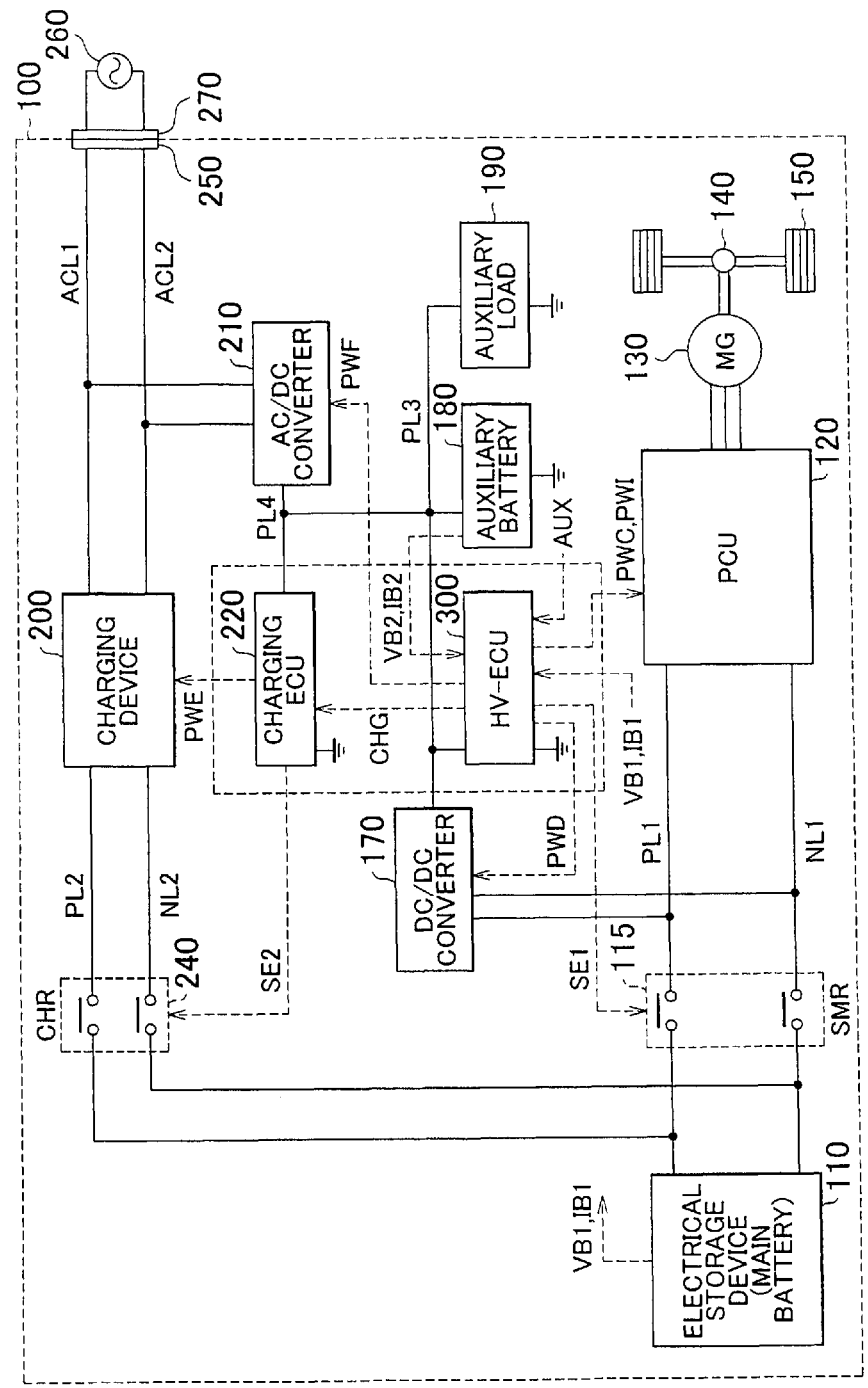
FIG. 1 is an overall block diagram of a vehicle equipped with a power supply system according to an embodiment of the invention.

Hereinafter, an embodiment of the invention will be described in detail with reference to the accompanying drawings. Note that like reference numerals denote the same or corresponding components and the description thereof is not repeated.

FIG. 1 is an overall block diagram of a vehicle 100 equipped with a power supply system according to the embodiment of the invention.

As shown in FIG. 1, the vehicle 100 includes an electrical storage device 110, a system main relay (hereinafter, also referred to as SMR) 115, a power control unit (PCU) 120 that serves as a driving device, a motor generator 130, a power transmission gear 140, drive wheels 150 and a controller (hereinafter, also referred to as HV-electronic control unit (ECU)) 300.

The electrical storage device 110 is an electric power storage element that is configured to be chargeable and dischargeable. The electrical storage device 110 is, for example, formed of a secondary battery, such as a lithium ion battery, a nickel-metal hydride battery and a lead-acid battery, or an electrical storage element, such as an electric double layer capacitor.

The electrical storage device 110 is connected via the SMR 115 to the PCU 120 for driving the motor generator 130. Then, the electrical storage device 110 supplies the PCU 120 with electric power for generating driving force of the vehicle 100. In addition, the electrical storage device 110 stores electric power generated by the motor generator 130. The output of the electrical storage device 110 is, for example, 200 V.

One ends of relays included in the SMR 115 are respectively connected to the positive electrode terminal and negative electrode terminal of the electrical storage device 110. The other ends of the relays included in the SMR 115 are respectively connected to a power line PL1 and a ground line NL1 that are connected to the PCU 120. Then, the SMR 115 switches between supply and interruption of electric power between the electrical storage device 110 and the PCU 120 on the basis of a control signal SE1 from the HV-ECU 300.

Figure 2:
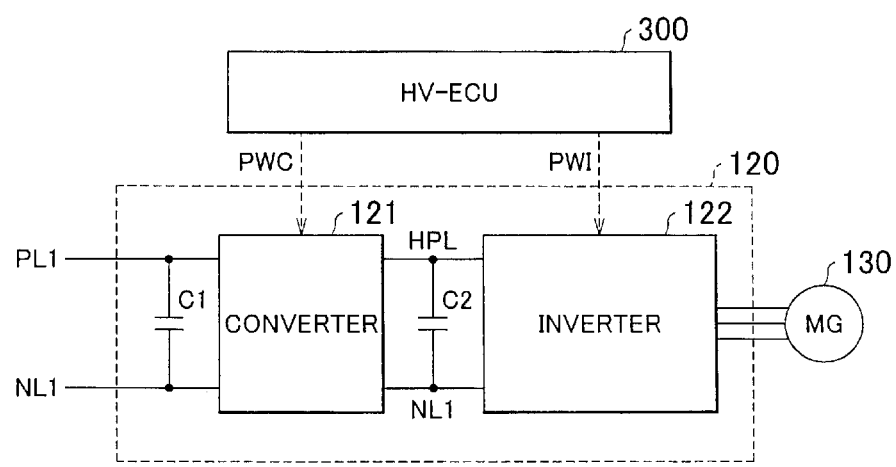
FIG. 2 is a view that shows an example of the internal configuration of a PCU according to the embodiment of the invention.

FIG. 2 is a view that shows an example of the internal configuration of the PCU 120. As shown in FIG. 2, the PCU 120 includes a converter 121, an inverter 122, and capacitors C1 and C2.

The converter 121 carries out power conversion between the power line PL1 and the ground line NL1, and a power line HPL and the ground line NL1 on the basis of a control signal PWC from the HV-ECU 300.

The inverter 122 is connected to the power line HPL and the ground line NL1. The inverter 122 converts direct-current electric power supplied from the converter 121 to alternating-current electric power to drive the motor generator 130 on the basis of a control signal PWI from the HV-ECU 300. Note that, in the present embodiment, a pair of the motor generator and the inverter are provided as an example; instead, multiple pairs of the motor generator and the inverter may be provided.

The capacitor C1 is provided between the power line PL1 and the ground line NL1 to reduce fluctuations in voltage between the power line PL1 and the ground line NL1. In addition, the capacitor C2 is provided between the power line HPL and the ground line NL1 to reduce fluctuations in voltage between the power line HPL and the ground line NL1.

Referring back to FIG. 1, the motor generator 130 is an alternating-current rotating electrical machine, and is, for example, a permanent magnet-type synchronous motor that includes a rotor in which a permanent magnet is embedded.

The output torque of the motor generator 130 is transmitted to the drive wheels 150 via the power transmission gear 140 to propel the vehicle 100. The power transmission gear 140 is formed of a reduction gear and a power split mechanism. The motor generator 130 is able to generate electric power using the rotational force of the drive wheels 150 during regenerative braking operation of the vehicle 100. Then, the generated electric power is converted by the PCU 120 to charging electric power to charge the electrical storage device 110.

In addition, in a hybrid vehicle equipped with an engine (not shown) in addition to the motor generator 130, the engine and the motor generator 130 are cooperatively operated to generate required vehicle driving force. In this case, the electrical storage device 110 may be charged with electric power generated from the rotation of the engine.

That is, the vehicle 100 according to the present embodiment is a vehicle equipped with an electric motor for generating vehicle driving force. The vehicle 100 includes a hybrid vehicle, an electric vehicle, a fuel cell vehicle, and the like. The hybrid vehicle generates vehicle driving force using an engine and an electric motor. The electric vehicle and the fuel cell vehicle are not equipped with an engine.

Portions of the configuration of the vehicle 100 shown in the drawing, excluding the motor generator 130, the power transmission gear 140 and the drive wheels 150, constitute the power supply system of the vehicle.

The power supply system further includes a DC/DC converter 170, an auxiliary battery 180 and an auxiliary load 190 as a configuration of a low-voltage system (auxiliary system).

The DC/DC converter 170 is connected to the power line PL1 and the ground line NL1. The DC/DC converter 170 steps down direct-current voltage supplied from the electrical storage device 110 on the basis of a control signal PWD from the HV-ECU 300. Then, the DC/DC converter 170 supplies electric power to the low-voltage system all over the vehicle, such as the auxiliary battery 180, the auxiliary load 190 and the HV-ECU 300, via a power line PL3.

The auxiliary battery 180 is typically formed of a lead-acid battery. The output voltage of the auxiliary battery 180 is lower than the output voltage of the electrical storage device 110, and is, for example, about 12 V.

The auxiliary load 190, for example, includes lamps, a wiper, a heater, an audio, a navigation system, and the like.

The HV-ECU 300 includes a central processing unit (CPU), a storage device and an input/output buffer (all of them are not shown in FIG. 1). The HV-ECU 300 inputs signals from sensors, or the like, and outputs control signals to devices. The HV-ECU 300 controls the vehicle 100 and the devices. Note that these controls are not limited to software processing; they may be processed by exclusive hardware (electronic circuit).

The HV-ECU 300 outputs control signals for controlling the PCU 120, the DC/DC converter 170, the SMR 115, and the like.

The HV-ECU 300 receives a detected voltage VB1 and a detected current IB1 from sensors (not shown) included in the electrical storage device 110. The HV-ECU 300 computes the state of charge SOC1 of the electrical storage device 110 on the basis of the voltage VB1 and the current IB1. In addition, the HV-ECU 300 receives a detected voltage VB2 and/or a detected current IB2 from sensors (not shown) included in the auxiliary battery 180. The HV-ECU 300 computes the state of charge SOC2 of the auxiliary battery 180 on the basis of the voltage VB2 and/or the current IB2.

In addition, the HV-ECU 300 receives a signal AUX that indicates the usage state and usage schedule of the auxiliary load 190. The signal AUX is set on the basis of the usage state resulting from driving signals to the devices included in the auxiliary load 190, electric power used, and the like, and the usage schedules of the devices, input through an input unit (not shown) by a driver. The HV-ECU 300 executes charging control (which will be descried later) on the basis of the SOC2 of the auxiliary battery 180 and the signal AUX relevant to the auxiliary load while the in-vehicle electrical storage device is being charged with a power supply (hereinafter, also simply referred to as "external power supply") outside the vehicle (hereinafter, also simply referred to as "external charging").

The power supply system includes a charging device 200, an AC/DC converter 210, a charging ECU 220, a charging relay (CHR) 240 and a connecting portion 250 as a configuration for charging the electrical storage device 110 with electric power supplied from the external power supply 260.

A charging connector 270 of the charging cable is connected to the connecting portion 250. Then, electric power from the external power supply 260 is transmitted to the vehicle 100 via the charging cable.

The charging device 200 is connected to the connecting portion 250 via power lines ACL1 and ACL2. In addition, the charging device 200 is connected to the electrical storage device 110 via the CHR 240. Then, the charging device 200 converts alternating-current electric power supplied from the external power supply 260 to direct-current electric power with which the electrical storage device 110 is chargeable on the basis of a control signal PWE from the charging ECU 220.

One ends of relays included in the CHR 240 are respectively connected to the positive electrode terminal and negative electrode terminal of the electrical storage device 110. The other ends of the relays included in the CHR 240 are respectively connected to the power line PL2 and the ground line NL2 that are connected to the charging device 200. Then, the CHR 240 switches between supply and interruption of electric power between the electrical storage device 110 and the charging device 200 on the basis of a control signal SE2 from the charging ECU 220.

The AC/DC converter 210 is connected to the power lines ACL1 and ACL2. The AC/DC converter 210 is controlled by a control signal PWF from the HV-ECU 300 to convert alternating-current voltage supplied from the external power supply 260 to direct-current voltage. Then, the AC/DC converter 210 supplies power supply voltage to the charging ECU 220 via a power line PL4. In addition, the power line PL4 is also connected to the power line PL3. Then, during external charging, electric power from the AC/DC converter 210 is used to make it possible to charge the auxiliary battery 180 and drive the auxiliary load 190. The AC/DC converter 210 is basically used to supply power supply voltage to the charging ECU 220, so the employed rated output of the AC/DC converter 210 is lower than the rated output of the above described DC/DC converter 170.

The charging ECU 220 is a controller for controlling the charging device 200 and the CHR 240. The charging ECU 220 is configured to be communicable with the HV-ECU 300. The charging ECU 220 controls the charging device 200 and the CHR 240 in accordance with a charging command CHG from the HV-ECU 300 to carry out external charging.

Note that, in FIG. 1, the charging ECU 220 is provided separately from the charging device 200; however, the charging ECU 220 may be included in the charging device 200. Alternatively, the HV-ECU 300 may be configured to include the function of the charging ECU 220.

In the thus configured vehicle 100, during operation of the vehicle, the DC/DC converter 170 is generally constantly operated in order to charge the auxiliary battery 180 and drive the auxiliary load 190.

Even during external charging, the auxiliary load 190 may be operated by the driver; however, an electric power consumed by the auxiliary load 190 in this case is mostly lower than an electric power consumed during operation of the vehicle.

Figure 3:
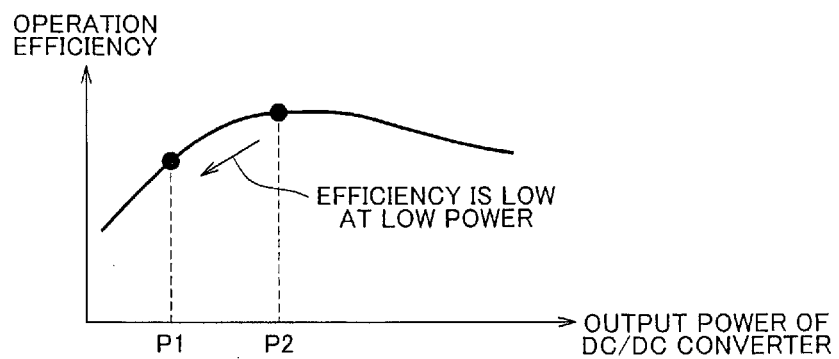
FIG. 3 is a graph that shows an example of the correlation between the output power of a DC/DC converter and the operation efficiency according to the embodiment of the invention.

The DC/DC converter 170 having a relatively large capacity as described above is generally employed in order to supply electric power to an auxiliary system during operation of the vehicle. FIG. 3 is a graph that shows an example of the correlation between the output power of the DC/DC converter 170 and the operation efficiency. In such a large-capacity DC/DC converter, as the output power decreases below a certain reference value (for example, point P2 in FIG. 3), the operation efficiency tends to gradually decrease. Therefore, as described above, during external charging in which consumed electric power is lower than that during operation of the vehicle, it is desirable not to operate the DC/DC converter 170 as much as possible.

On the other hand, when the DC/DC converter 170 is not operated, the HV-ECU 300 and the auxiliary load 190 are supplied with power supply voltage from the auxiliary battery 180 in principle. However, as electric power is consumed by the HV-ECU 300 and the auxiliary load 190, the SOC2 of the auxiliary battery 180 gradually decreases. Therefore, it is required to charge the auxiliary battery 180.

Then, in the present embodiment, during external charging, charging control for varying charging electric power from the charging device 200 to the electrical storage device 110 and charging electric power from the small-capacity AC/DC converter 210 to the auxiliary battery 180 is executed on the basis of the state of charge of the auxiliary battery 180 and the state of the auxiliary load 190. Such control is executed during external charging so that the state of charge SOC2 of the auxiliary battery 180 does not become lower than a lower limit threshold as much as possible. The auxiliary battery 180 is required to be charged by the DC/DC converter 170 at or below the lower limit threshold. By so doing, the frequency of use of the DC/DC converter 170 is reduced to suppress a decrease in charging efficiency.

Figure 4:
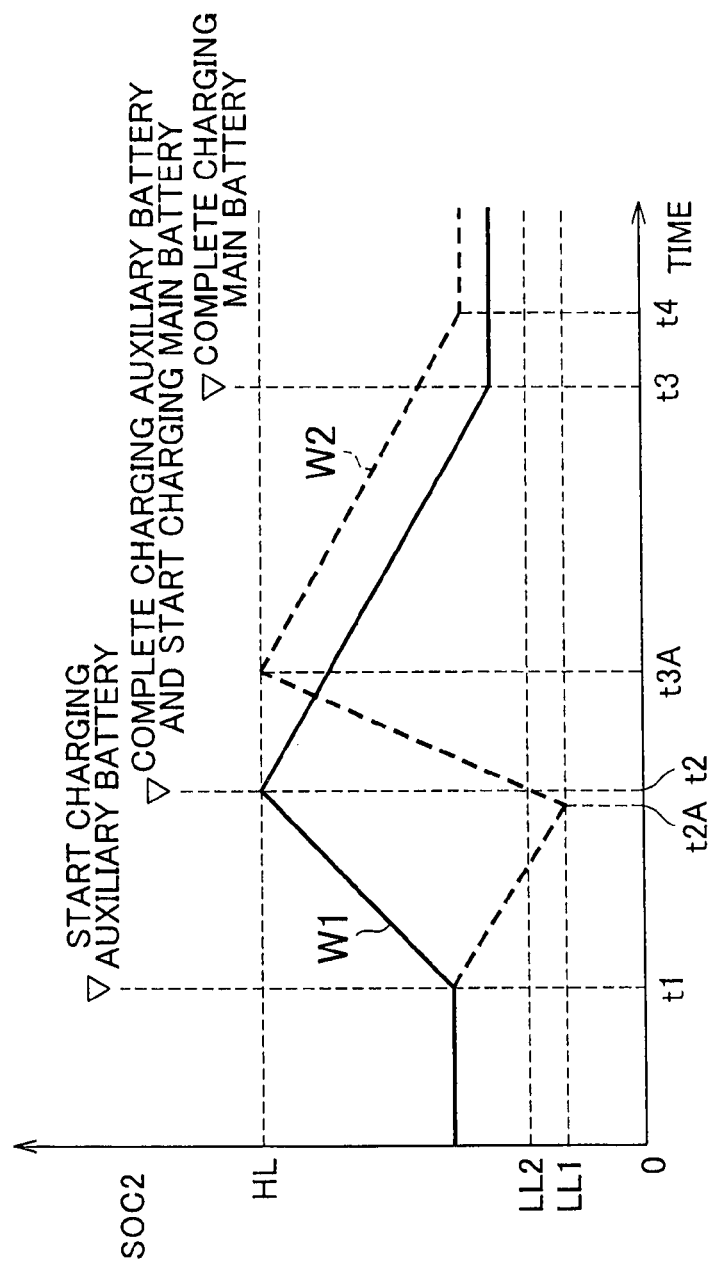
FIG. 4 is a first graph for illustrating the outline of charging control over an auxiliary battery during external charging according to the embodiment of the invention.

FIG. 4 is a graph for illustrating the outline of charging control over the auxiliary battery 180 during external charging according to the present embodiment. In FIG. 4, the abscissa axis represents time, and the ordinate axis represents the state of charge SOC2 of the auxiliary battery 180.

As shown in FIG. 1 and FIG. 4, until time t1, the vehicle 100 is neither operated nor subjected to external charging, both the AC/DC converter 210 and the DC/DC converter 170 are stopped, and the state of charge SOC2 of the auxiliary battery 180 is also constant.

At time t1, the charging connector 270 of the charging cable is connected to the connecting portion 250 of the vehicle 100, and the operation of the AC/DC converter 210 is started accordingly. In the present embodiment, at the start of external charging, first, the auxiliary battery 180 is charged before charging the electrical storage device 110 that is a main battery. This is because of the following reason.

Generally, the auxiliary battery 180 is mostly held at a low voltage state normally, that is, in a state where SOC2 is relatively low, in order to reduce a loss due to self discharge and reduce internal resistance. Therefore, at the start of external charging, the SOC2 of the auxiliary battery 180 is mostly low, so, when the charging of the electrical storage device 110 is started in this state, it may be required to charge the auxiliary battery 180 immediately after the start of charging. Then, it may be required to operate the DC/DC converter 170 in some cases, so the operation may be adverse to the purpose of preventing a decrease in charging efficiency by minimizing the frequency of operation of the DC/DC converter 170. Thus, in the present embodiment, first, the auxiliary battery 180 is fully charged immediately after the start of external charging and subsequently the charging of the electrical storage device 110 is started to thereby minimize the frequency of operation of the DC/DC converter 170.

When the auxiliary battery 180 is charged by the AC/DC converter 210 between time t1 and time t2, the charging device 200 is not operated, so the charging ECU 220 is also stopped. At this time, the output power of the AC/DC converter 210 is set to a maximum rated output power (for example, 150 W). By so doing, almost all the electric power that can be output by the AC/DC converter 210 may be used as charging electric power to charge the auxiliary battery 180 (additionally, driving electric power to drive the auxiliary load 190 when the auxiliary load 190 is used).

After the charging of the auxiliary battery 180 by the AC/DC converter 210 is started from time t1, the state of charge SOC2 of the auxiliary battery 180 increases (line W1 in FIG. 4). When the state of charge SOC2 reaches a threshold HL that indicates a full charge (time t2), the charging ECU 220 is started up in accordance with the charging command CHG from the HV-ECU 300. By so doing, the charging of the electrical storage device 110 by the charging device 200 is started.

At time t2, it is not required to charge the auxiliary battery 180, the output power of the AC/DC converter 210 is set to an electric power (for example, 100 W) required to drive the charging ECU 220. On the other hand, the charging device 200 uses an electric power (for example, 1400 W), which is obtained by subtracting an electric power used in the AC/DC converter 210 (that is, electric power required to drive the charging ECU 220) from an electric power supplied from the external power supply 260 (for example, 1500 W), to charge the electrical storage device 110.

Then, when the charging of the electrical storage device 110 is completed at time t3, the operation of the charging device 200 and the operation of the AC/DC converter 210 are stopped. Between time t3 and time t4, no charging electric power is supplied to the auxiliary battery 180, and electric power stored in the auxiliary battery 180 is consumed by the auxiliary load 190 and the HV-ECU 300, so SOC2 gradually decreases.

In addition, in FIG. 4, for comparison, the broken line W2 indicates a case where charging control according to the present embodiment is not applied and the electrical storage device 110 is charged immediately when external charging is started at time t1.

In this case, after the charging of the electrical storage device 110 is started, no charging electric power is supplied to the auxiliary battery 180, so SOC2 gradually decreases.

After that, at the time point (time t2A) when the state of charge SOC2 of the auxiliary battery 180 has decreased to a lower limit threshold LL1 that indicates that it is required to charge the auxiliary battery 180, the DC/DC converter 170 is operated, and the charging of the auxiliary battery 180 is started.

When the charging of the auxiliary battery 180 is completed at time t3A, the DC/DC converter 170 is stopped. Then, at time t4, the charging of the electrical storage device 110 is completed.

In this way, in the example shown in FIG. 4, the present embodiment is applied to regulate charging electric power to charge the electrical storage device 110 and charging electric power to charge the auxiliary battery 180 in accordance with the state of charge SOC2 of the auxiliary battery 180 to thereby make it possible to prevent operation of the DC/DC converter 170 during external charging.

A case where the auxiliary battery 180 is recharged after the charging of the electrical storage device 110 is started in charging control over the auxiliary battery 180 according to the present embodiment will be described with reference to FIG. 5 and FIG. 6.

Figure 5:
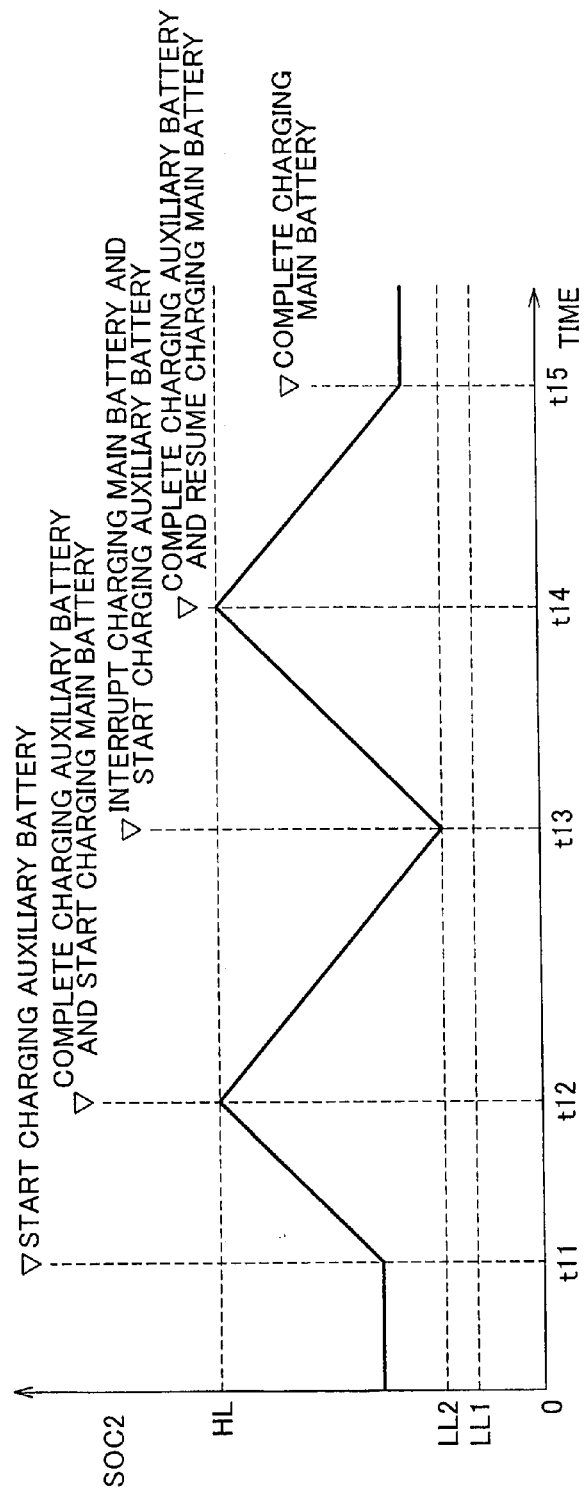
FIG. 5 is a second graph for illustrating the outline of charging control over the auxiliary battery during external charging according to the embodiment of the invention.

FIG. 5 is a time chart of a case where an electric power consumed by the auxiliary load 190 is relatively low and it is possible to charge the auxiliary battery 180 and drive the auxiliary load 190 using the maximum output power of the AC/DC converter 210.

As shown in FIG. 1 and FIG. 5, the same operation is performed until t12 as that until t2 in FIG. 4, the auxiliary battery 180 is charged before charging the electrical storage device 110.

The charging of the auxiliary battery 180 is completed at time t12, and the output power of the charging device 200 is increased to preferentially charge the electrical storage device 110. Accordingly, the SOC2 of the auxiliary battery 180 decreases; however, in FIG. 5, an electric power consumed by the auxiliary load 190 is high or the level of the SOC1 of the electrical storage device 110 is low as compared with FIG. 4, so charging takes time. Therefore, before the charging of the electrical storage device 110 is completed, the SOC2 of the auxiliary battery 180 decreases to another threshold LL2 that is slightly higher than the lower limit threshold LL1 in FIG. 4 (time t13).

The threshold LL2 is used to switch into a mode such that the auxiliary battery 180 is more preferentially charged than the electrical storage device 110. At time t13, the output power of the AC/DC converter 210 is increased to around the maximum rated power (for example, 150 W). In addition, the operation of the charging device 200 and the operation of the charging ECU 220 are stopped. By so doing, the charging of the auxiliary battery 180 is started.

Then, when the charging of the auxiliary battery 180 is completed at time t14, as in the case at time t12, the output power of the AC/DC converter 210 is decreased to an electric power required to drive the charging ECU 220, and the charging of the electrical storage device 110 by the charging device 200 is resumed.

Note that, at time t13, in a state where the charging ECU 220 is operated, an electric power of 50 W may be supplied to the auxiliary battery 180 in the above example. If an electric power consumed by the auxiliary load 190 and the HV-ECU 300 is lower than 50 W, the output power of the charging device 200 is decreased (to, for example, 1350 W) to make it possible to charge the electrical storage device 110 and the auxiliary battery 180 at the same time.

Figure 6:
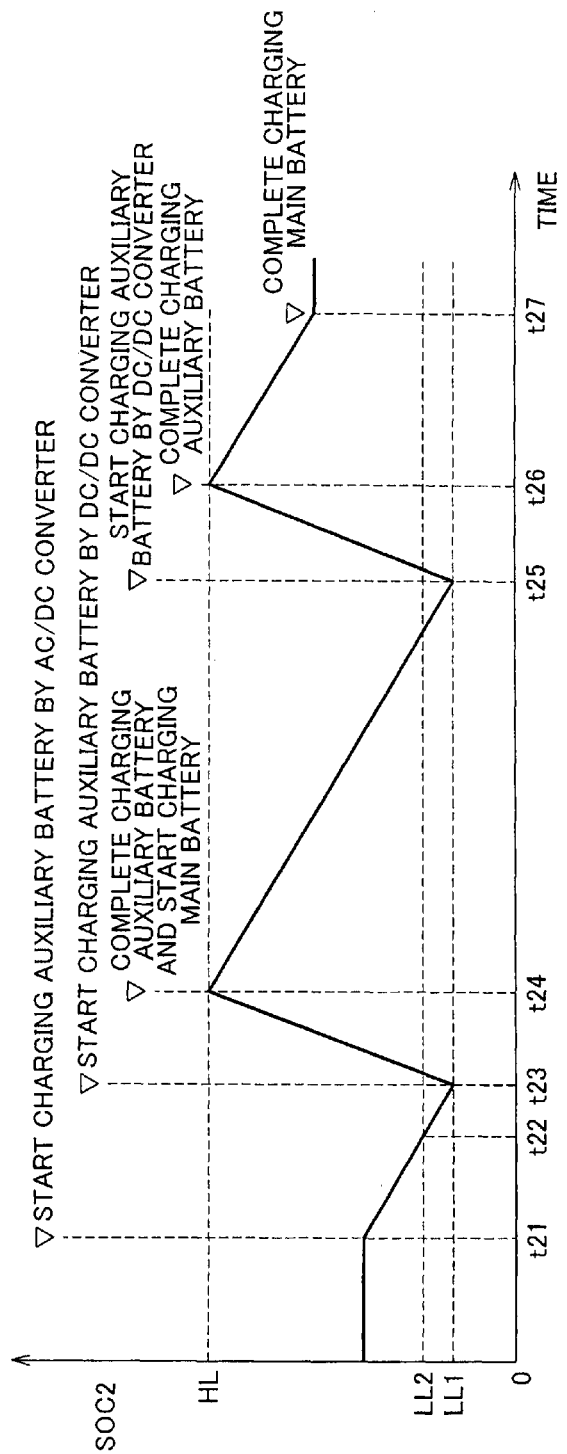
FIG. 6 is a third graph for illustrating the outline of charging control over the auxiliary battery during external charging according to the embodiment of the invention.

FIG. 6 is a time chart of a case where an electric power consumed by the auxiliary load 190 is relatively high (for example, 200 W) and the output power of the AC/DC converter 210 does not suffice electric power to charge the auxiliary battery 180.

As shown in FIG. 6, as in the case of FIG. 4 and FIG. 5, at time t21, the charging of the auxiliary battery 180 is started before charging the electrical storage device 110. However, in the case of FIG. 6, electric power (for example, 200 W) consumed by the auxiliary load 190 exceeds electric power (for example, 150 W) that may be supplied by the AC/DC converter 210, so the auxiliary battery 180 is not charged and, contrarily, electric power is output also from the auxiliary battery 180 in order to drive the auxiliary load 190. Thus, SOC2 gradually decreases.

At time t22, SOC2 has decreased to the threshold LL2; however, the maximum power of the AC/DC converter 210 is already output, so SOC2 further decreases. Then, at time t23, when SOC2 has decreased to the lower limit threshold LL1, the DC/DC converter 170 is operated to charge the auxiliary battery 180 (from time t23 to time t24) as in the case of the comparative embodiment shown by the broken line W2 in FIG. 4. When the charging of the auxiliary battery 180 is completed, the DC/DC converter 170 is stopped, and the charging of the electrical storage device 110 is started. Then, when SOC2 decreases to the lower limit threshold LL1 again while the electrical storage device 110 is being charged (time t25), the DC/DC converter 170 is operated to charge the auxiliary battery 180 as in the case from time t23 to time t24 (from time t25 to time t26). Note that, while the auxiliary battery 180 is being charged by the DC/DC converter 170 (from time t23 to time t24), the electrical storage device 110 may be charged by the charging device 200 at the same time. When the charging of the auxiliary battery 180 is completed, the charging of the electrical storage device 110 is started as in the case after time t24.

As described with reference to FIG. 4 to FIG. 6, charging electric power to charge the auxiliary battery 180 and charging electric power to charge the electrical storage device 110 are regulated on the basis of the state of charge SOC2 of the auxiliary battery 180 and the usage state of the auxiliary load 190 to thereby make it possible to minimize operation of the DC/DC converter 170 except that an electric power consumed by the auxiliary load 190 is high as shown in FIG. 6. As a result, the frequency of operation of the DC/DC converter 170 is reduced at a low electric power at which the operation efficiency is low, so it is possible to suppress a decrease in charging efficiency during external charging.

Figure 7:
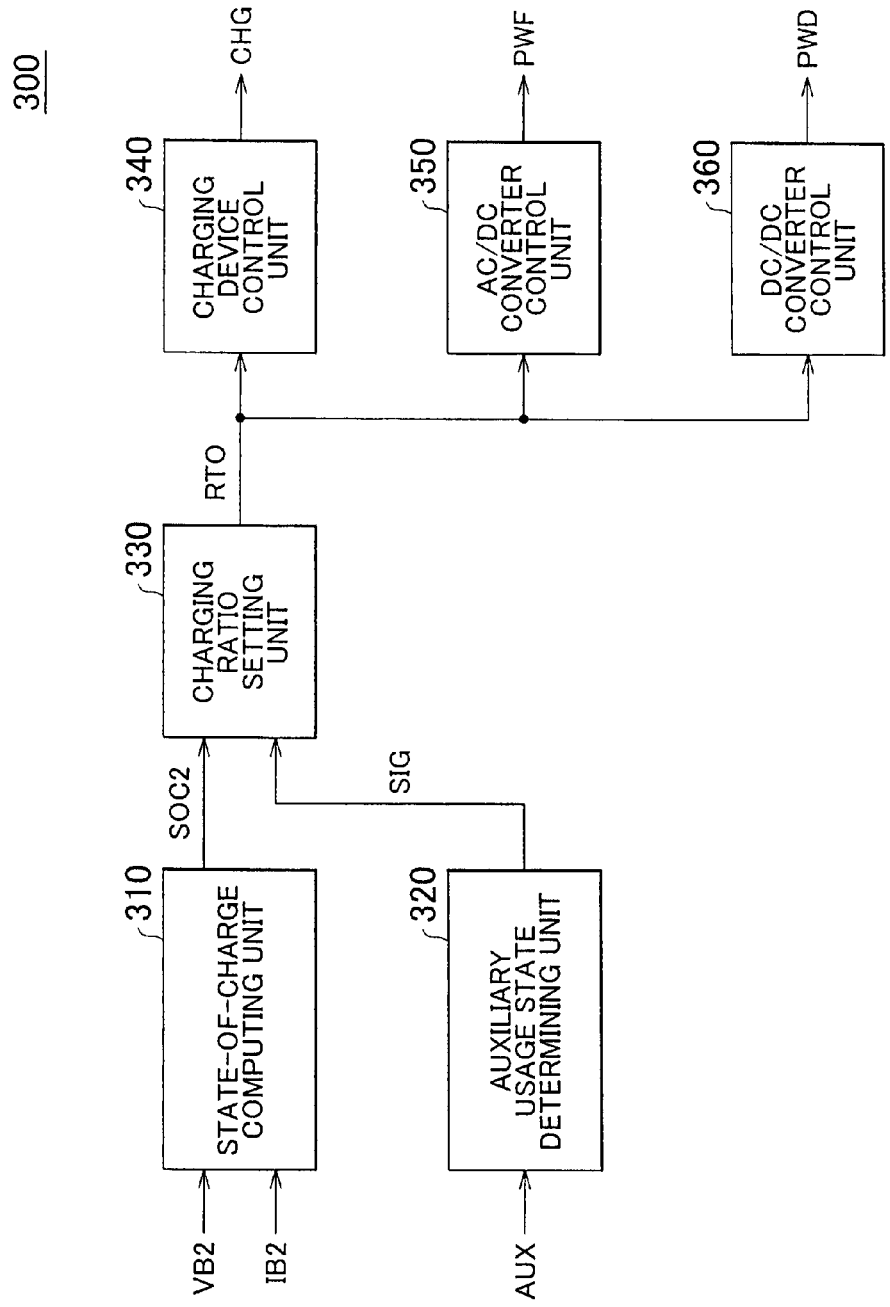
FIG. 7 is a functional block diagram for illustrating charging control executed by an HV-ECU over the auxiliary battery during external charging according to the embodiment of the invention.

FIG. 7 is a functional block diagram for illustrating charging control executed by the HV-ECU 300 over the auxiliary battery 180 during external charging according to the present embodiment. The functional blocks shown in the functional block diagram of FIG. 7 are implemented through hardware processing or software processing by the HV-ECU 300.

As shown in FIG. 1 and FIG. 7, the HV-ECU 300 includes a state-of-charge computing unit 310, an auxiliary usage state determining unit 320, a charging ratio setting unit 330, a charging device control unit 340, an AC/DC converter control unit 350 and a DC/DC converter control unit 360.

The state-of-charge computing unit 310 receives the voltage VB2 and current IB2 of the auxiliary battery 180. The state-of-charge computing unit 310 computes the state of charge (SOC2) of the auxiliary battery 180 on the basis of these pieces of information, and outputs the computed SOC2 to the charging ratio setting unit 330.

The auxiliary usage state determining unit 320 receives the signal AUX that indicates the operation state and operation schedule of the auxiliary load 190. The auxiliary usage state determining unit 320 recognizes the usage state, including the usage schedules of the devices included in the auxiliary load 190, and consumed electric power on the basis of the signal AUX. Then, the auxiliary usage state determining unit 320 outputs a signal SIG relevant to the usage states of the auxiliaries to the charging ratio setting unit 330.

The charging ratio setting unit 330 receives the state of charge SOC2 from the state-of-charge computing unit 310 and the usage states of the auxiliaries from the auxiliary usage state determining unit 320. On the basis of these pieces of information, the charging ratio setting unit 330 sets charging electric power to charge the auxiliary battery 180 and charging electric power to charge the electrical storage device 110, and determines whether the DC/DC converter 170 is operated. Then, the charging ratio setting unit 330 outputs a signal RTO that indicates the ratios of output powers of the charging device 200, AC/DC converter 210 and DC/DC converter 170 to the charging device control unit 340, the AC/DC converter control unit 350 and the DC/DC converter control unit 360 on the basis of the above results. Note that the above ratios are desirably set as the ratios of commanded output powers to the respective rated output powers of the charging device 200, AC/DC converter 210 and DC/DC converter 170.

The charging device control unit 340 receives the signal RTO from the charging ratio setting unit 330. Then, the charging device control unit 340 generates a charging command CHG for outputting the set electric power on the basis of the signal RTO, and then outputs the charging command CHG to the charging ECU 220.

The AC/DC converter control unit 350 receives the signal RTO from the charging ratio setting unit 330. Then, the AC/DC converter control unit 350 generates a control signal PWF for outputting the set electric power on the basis of the signal RTO, and then outputs the control signal PWF to the AC/DC converter 210.

The DC/DC converter control unit 360 receives the signal RTO from the charging ratio setting unit 330. Then, the DC/DC converter control unit 360 generates a control signal PWD for outputting the set electric power on the basis of the signal RTO, and then outputs the control signal PWD to the DC/DC converter 170.

Figure 8:
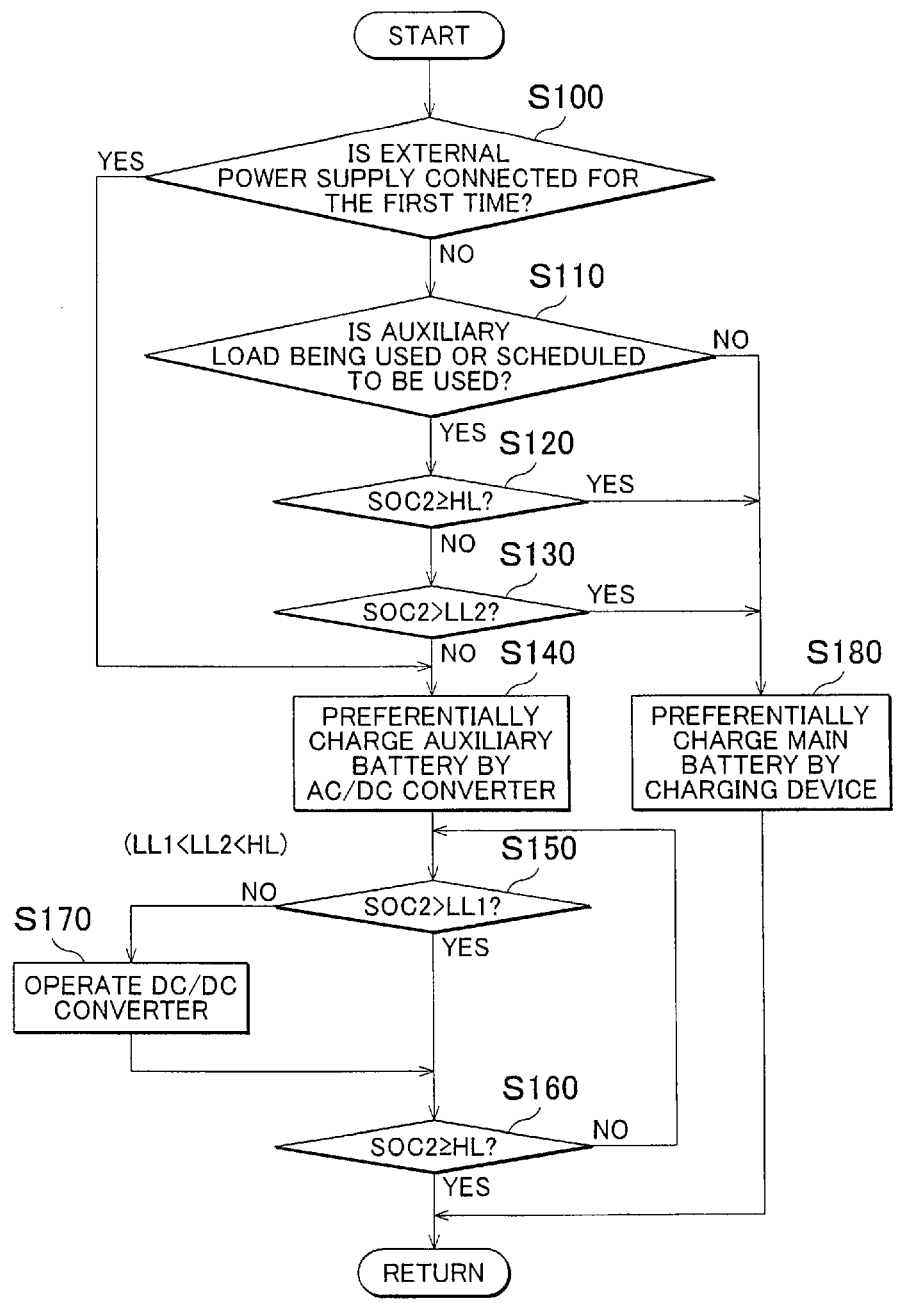
FIG. 8 is a flowchart for illustrating the detailed charging control process executed by the HV-ECU over the auxiliary battery during external charging according to the embodiment of the invention.

FIG. 8 is a flowchart for illustrating the detailed charging control process executed by the HV-ECU 300 over the auxiliary battery 180 during external charging according to the present embodiment. The process of the flowchart shown in FIG. 8 is implemented in such a manner that a program prestored in the HV-ECU 300 is called from a main routine and is executed at a predetermined interval. Alternatively, the process of part of or all the steps may be implemented by exclusive hardware (electronic circuit).

As shown in FIG. 1 and FIG. 8, in step (hereinafter, step is abbreviated as S) 100, the HV-ECU 300 determines whether the external power supply is connected to the connecting portion 250. In S100, the determination is affirmative only when the charging connector 270 is connected to the connecting portion 250 for the first time, and the determination is negative in a state where the connection is continued thereafter.

When the external power supply is connected for the first time (YES in S100), S110 to S130 are skipped, and the process proceeds to S140. Then, the HV-ECU 300 starts up the AC/DC converter 210, and starts charging the auxiliary battery 180 before charging the electrical storage device 110.

Subsequently, the HV-ECU 300 determines in S150 whether the state of charge SOC2 of the auxiliary battery 180 is higher than the lower limit threshold LL1.

When SOC2 is higher than the lower limit threshold LL1 (YES in S150), the process proceeds to S160, and then the HV-ECU 300 determines whether SOC2 is higher than or equal to the upper limit threshold HL.

When SOC2 is lower than the upper limit threshold HL (NO in S160), the HV-ECU 300 determines that the charging of the auxiliary battery 180 is not completed yet, and returns the process to S150 to continue charging the auxiliary battery 180.

When SOC2 is higher than or equal to the upper limit threshold HL (YES in S160), the HV-ECU 300 determines that the charging of the auxiliary battery 180 is completed, and returns the process to the main routine.

Here, when SOC2 is lower than or equal to the lower limit threshold LL1 (NO in S150), the HV-ECU 300 determines that an electric power consumed by the auxiliary load 190 is higher than the rated output power of the AC/DC converter 210 and the AC/DC converter 210 cannot charge the auxiliary battery 180 as described with reference to FIG. 6. Then, in S170, the HV-ECU 300 operates the DC/DC converter 170 and uses electric power supplied from the electrical storage device 110 to charge the auxiliary battery 180 with an electric power higher than the rated output power of the AC/DC converter 210. After that, the process proceeds to S160, and it is determined whether the charging of the auxiliary battery 180 is completed as described above.

Although not shown in FIG. 8, when the DC/DC converter 170 is operated, the operation of the DC/DC converter 170 is continued until the charging of the auxiliary battery 180 is completed even when SOC2 increases.

On the other hand, when the external power supply is connected not for the first time (NO in S100), the process proceeds to S110. Then, the HV-ECU 300 determines whether the auxiliary load 190 is being used or whether the auxiliary load 190 is scheduled to be used during external charging.

When the auxiliary load 190 is being used or the auxiliary load 190 is scheduled to be used during external charging (YES in S110), the process proceeds to S120, and then the HV-ECU 300 determines whether SOC2 is higher than or equal to the upper limit threshold, that is, whether the auxiliary battery 180 is fully charged.

When SOC2 is lower than the upper limit threshold (NO in S120), the process proceeds to S130, and then the HV-ECU 300 determines whether SOC2 is higher than the threshold LL2.

When SOC2 is lower than or equal to the threshold LL2 (NO in S130), the HV-ECU 300 determines that it is required to charge the auxiliary battery 180, and then the process proceeds to S140.

In S140, in order for the auxiliary battery 180 to be more preferentially charged than the electrical storage device 110, the HV-ECU 300 increases the output power of the AC/DC converter 210, and decreases the output power of the charging device 200 or stops the charging device 200 as described with reference to FIG. 5 and FIG. 6. The following process from S150 to S170 is the same as that described above.

When the auxiliary load 190 is neither being used nor scheduled to be used during external charging (NO in S110), when SOC2 is higher than or equal to the upper limit threshold (YES in S120) or when SOC2 is higher than the threshold LL2 (YES in S130), the HV-ECU 300 determines that it is not required to charge the auxiliary battery 180. Then, the process proceeds to S180, and the HV-ECU 300 decreases the output power of the AC/DC converter 210 to an electric power required to operate the charging ECU 220 so that the electrical storage device 110 is preferentially charged by the charging device 200. Furthermore, the HV-ECU 300 maximizes the output power of the charging device 200 within a range in which an electric power used in the vehicle 100 during external charging does not exceed an electric power that may be supplied by the external power supply 260. Although not shown in the drawing, even when the auxiliary load 190 is neither being used nor scheduled to be used during external charging (NO in S110), but when SOC2 of the auxiliary battery 180 is lower than or equal to the threshold LL2, the auxiliary battery 180 is charged as in the case of S140.

By executing control in accordance with the above described process, it is possible to regulate charging electric power to charge the auxiliary battery 180 and charging electric power to charge the electrical storage device 110 on the basis of the state of charge SOC2 of the auxiliary battery 180 and the usage state of the auxiliary load 190. By so doing, it is possible to minimize operation of the DC/DC converter 170 during external charging. As a result, the frequency of operation of the DC/DC converter 170 is reduced at a low electric power at which the operation efficiency is low, so it is possible to suppress a decrease in charging efficiency during external charging.

Alternative Embodiment

In the above described embodiment, electric power is supplied to the charging ECU, the auxiliary battery, and the like, by the AC/DC converter using electric power from the external power supply.

Incidentally, some charging devices for charging the electrical storage device include a rectifier circuit that converts alternating-current voltage supplied from the external power supply to direct-current voltage. In the case of such a charging device, it is also applicable that a DC/DC converter that steps down direct-current voltage converted by the rectifier circuit is used instead of the AC/DC converter.

In the alternative embodiment, an example of a configuration that includes a small-capacity DC/DC converter instead of the AC/DC converter will be described.

Figure 9:
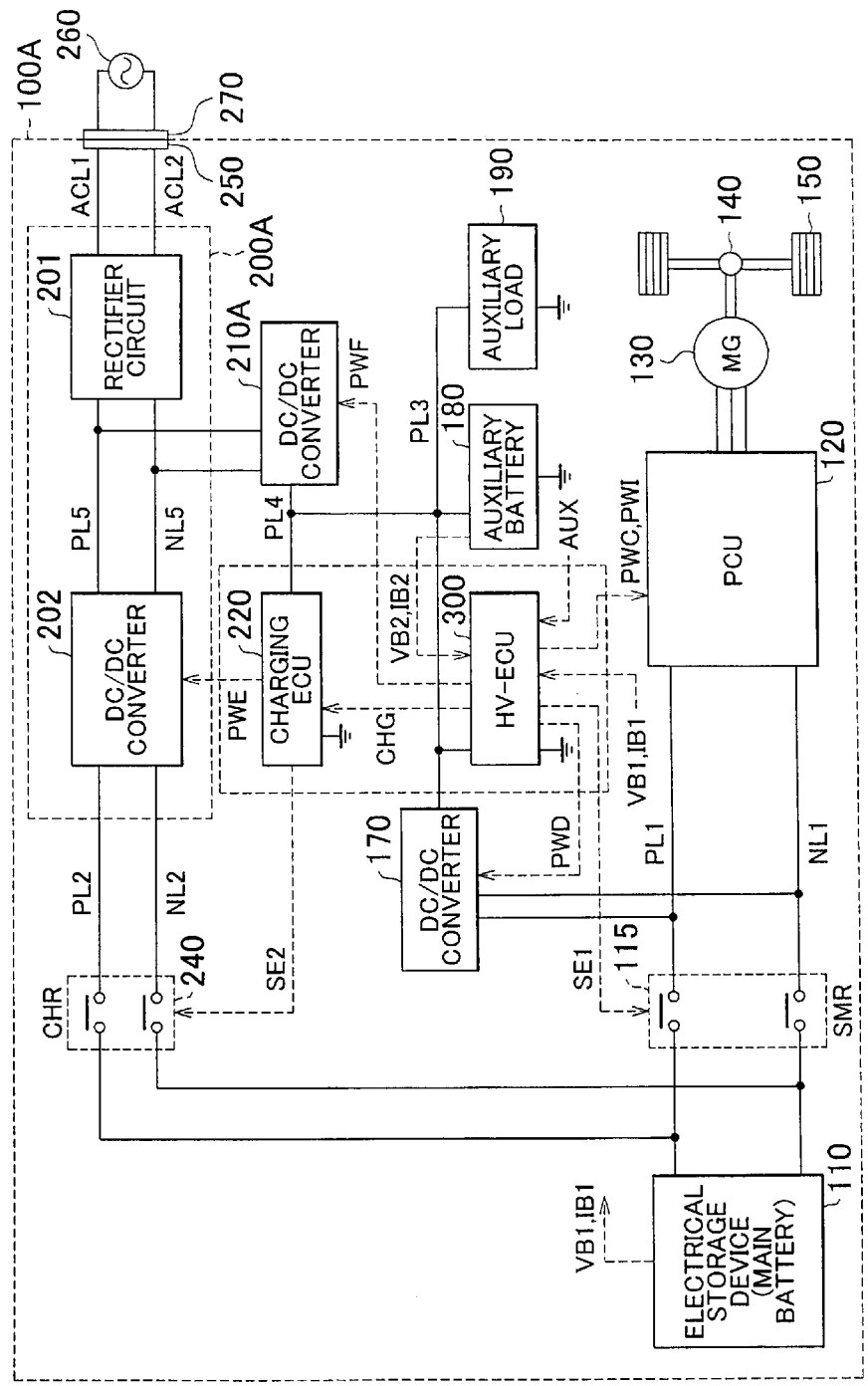
FIG. 9 is an overall block diagram of a vehicle equipped with a power supply system according to an alternative embodiment to the embodiment of the invention.

FIG. 9 is an overall block diagram of a vehicle 100A equipped with a power supply system according to the alternative embodiment to the above embodiment. In FIG. 9, the charging device 200 in the configuration shown in FIG. 1 according to the above embodiment is replaced with a charging device 200A, and a small-capacity DC/DC converter 210A is provided instead of the AC/DC converter 210. In FIG. 9, the description of elements that overlap with those in FIG. 1 is not repeated.

As shown in FIG. 9, the charging device 200A includes a rectifier circuit 201 and a DC/DC converter 202. The rectifier circuit 201 is connected to the connecting portion 250 via the power lines ACL1 and ACL2. The rectifier circuit 201 rectifies alternating-current voltage supplied from the external power supply 260 to direct-current voltage, and outputs the direct-current voltage to a power line PL5 and a ground line NL5.

Figure 10:
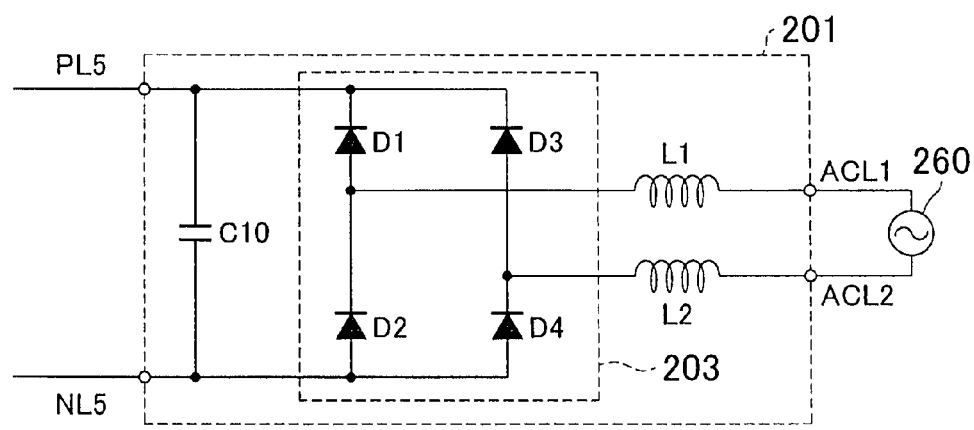
FIG. 10 is a view that shows an example of the internal configuration of a rectifier circuit according to the embodiment of the invention.

FIG. 10 is a view that shows an example of the internal structure of the rectifier circuit 201. The rectifier circuit 201 includes reactors L1 and L2, a diode bridge 203 and a capacitor C10. The diode bridge 203 includes diodes D1 to D4.

The diode bridge 203 is formed so that the serially-connected diodes D1 and D2 and the serially-connected diodes D3 and D4 are connected to the power line PL5 and the ground line NL5 in parallel with each other.

One end of the reactor L1 is connected to a connection node of the diodes D1 and D2, and the other end of the reactor L1 is connected to the power line ACL1. In addition, one end of the reactor L2 is connected to a connection node of the diodes D3 and D4, and the other end of the reactor L2 is connected to the power line ACL2.

The capacitor C10 is connected between the power line PL5 and the ground line NL5 in parallel with the diode bridge 203, and reduces fluctuations in voltage between the power line PL5 and the ground line NL5.

With the above configuration, the rectifier circuit 201 rectifies alternating-current voltage supplied from the external power supply 260 to direct-current voltage. Note that the configuration of the rectifier circuit 201 is not limited to the configuration shown in FIG. 10 as long as it is a circuit that is able to convert alternating-current voltage to direct-current voltage. As an example of another rectifier circuit, the configuration of the rectifier circuit may be, for example, a full-bridge converter or a half-bridge converter; however, the rectifier circuit is desirably configured as shown in FIG. 10 so as not to require special control to thereby not increase a control load with a simple configuration.

Referring back to FIG. 9, the DC/DC converter 202 is connected to the rectifier circuit 201 via the power line PL5 and the ground line NL5. In addition, the DC/DC converter 202 is connected to the electrical storage device 110 via the CHR 240 by the power line PL2 and the ground line NL2. The DC/DC converter 202 is controlled by the control signal PWE from the charging ECU 220. The DC/DC converter 202 converts direct-current voltage output from the rectifier circuit 201, and supplies charging electric power to the electrical storage device 110.

The DC/DC converter 210A is connected to the power line PL5 and the ground line NL5. The DC/DC converter 210A is controlled by the control signal PWF from the HV-ECU 300. The DC/DC converter 210A steps down direct-current voltage output from the rectifier circuit 201, and outputs the direct-current voltage to the power line PL4.

With the above configuration, by executing the same control as that of the above embodiment, the operation of the high-capacity DC/DC converter 170 is minimized during external charging to thereby make it possible to suppress a decrease in charging efficiency during external charging.

Note that the charging ECU 220 and the HV-ECU 300 according to the above embodiments are an example of a controller according to the aspect of the invention. The electrical storage device 110 and the auxiliary battery 180 according to the above embodiments respectively an example of a first electrical storage device according to the aspect of the invention and an example of a second electrical storage device according to the aspect of the invention. The DC/DC converter 170 according to the above embodiments is an example of a first converter according to the aspect of the invention. The AC/DC converter 210 and the DC/DC converter 210A according to the above embodiments are an example of a second converter according to the aspect of the invention.

The embodiments described above are illustrative and not restrictive in all respects. The scope of the invention is defined by the appended claims rather than the above description. The scope of the invention is intended to encompass all modifications within the scope of the appended claims and equivalents thereof.

The invention claimed is:

1. A power supply system comprising:
   a rechargeable first electrical storage device;
   a charging device configured to charge the first electrical storage device with electric power from an external power supply;
   a second electrical storage device configured to supply an auxiliary load with a power supply voltage lower than an output voltage of the first electrical storage device;
   a first converter that steps down a voltage of electric power from the first electrical storage device and that supplies a power supply voltage to the auxiliary load and the second electrical storage device;
   a second converter having a capacity smaller than that of the first converter and configured to charge the second electrical storage device with the electric power from the external power supply; and
   a controller that, when charging with the use of the external power supply is executed, controls charging electric power from the charging device to the first electrical storage device and charging electric power from the second converter to the second electrical storage device on the basis of a state of charge of the second electrical storage device and a usage state of the auxiliary load;
   wherein when it is required to charge the second electrical storage device, the controller sets the charging electric power to the first electrical storage device and the charging electric power to the second electrical storage device such that the second electrical storage device is more preferentially charged than the first electrical storage device is charged.

2. The power supply system according to claim 1, wherein when charging with the use of the external power supply is started, the controller causes execution of charging of the second electrical storage device with the use of the second converter before starting an initial operation for charging the first electrical storage device with the use of the charging device.

3. The power supply system according to claim 2, wherein when the state of charge of the second electrical storage device reaches a reference value that indicates a full charge, the controller decreases the charging electric power to the second electrical storage device and starts charging of the first electrical storage device with the use of the charging device.

4. The power supply system according to claim 2, wherein when the state of charge of the second electrical storage device is decreased a second threshold that is higher than a first threshold at or below which the first converter is required to be driven, the controller decreases the charging electric power to the first electrical storage device and increases the charging electric power to the second electrical storage device with the use of the second converter.

5. The power supply system according to claim 2, wherein when the state of charge of the second electrical storage device is decreased to a first threshold at or below which the first converter is required to be driven, the controller causes execution of the second electrical storage device with the use of the first converter.

6. The power supply system according to claim 1, wherein the first converter has such a characteristic that an operation efficiency of the first converter decreases when an output power of the first converter decreases below a reference value.

7. The power supply system according to claim 1, wherein the second converter is an AC/DC converter configured to convert alternating-current electric power from the external power supply to direct-current electric power.

8. The power supply system according to claim 1, wherein the charging device includes a rectifier circuit for rectifying alternating-current electric power from the external power supply, to direct-current electric power, and the second converter is a DC/DC converter configured to execute voltage conversion of direct-current voltage rectified by the rectifier circuit.

9. A vehicle comprising a power supply system according to claim 1, a driving device configured to generate a driving force for propelling the vehicle with electric power from the first electrical storage device, and an auxiliary load.

10. A vehicle comprising a power supply system according to claim 2, a driving device configured to generate a driving force for propelling the vehicle with electric power supplied from the first electrical storage device, and them auxiliary load.

11. A vehicle comprising a power supply system according to claim 3, a driving device configured to generate a driving force for propelling the vehicle with electric power from the first electrical storage device, and an auxiliary load.

12. A vehicle comprising a power supply system according to claim 4, a driving device configured to generate a driving force for propelling the vehicle with electric power from the first electrical storage device, and an auxiliary load.

13. A vehicle comprising a power supply system according to claim 5, a driving device configured to generate a driving force for propelling the vehicle with electric power from the first electrical storage device, and an auxiliary load.

14. A vehicle comprising a power supply system according to claim 6, a driving device configured to generate a driving force for propelling the vehicle with electric power from the first electrical storage device, and an auxiliary load.

15. A vehicle comprising a power supply system according to claim 7, a driving device configured to generate a driving force for propelling the vehicle with electric power from the first electrical storage device, and an auxiliary load.

16. A vehicle comprising a power supply system according to claim 8, a driving device configured to generate a driving force for propelling the vehicle with electric power from the first electrical storage device, and an auxiliary load.

17. The power supply system according to claim 1, wherein the first converter and the second converter are connected in parallel to the second electrical storage device.

18. The power supply system according to claim 1, wherein the controller controls charging electric power responsive to an auxiliary signal received from the auxiliary load, the auxiliary signal indicating the usage state of the auxiliary load.

19. The power supply system according to claim 1, wherein
the charging device is configured to charge the first electrical storage device with electric power directly from the external power supply, and
the second converter is configured to charge the second electrical storage device with the electric power directly from the external power supply.

20. The power supply system according to claim 1, wherein the charging device and the second converter are connected in parallel to each other with respect to the external power supply.

21. The power supply system according to claim 1, wherein operation of the charging device is reduced when the second electrical storage device is more preferentially charged than the first electrical storage device is charged.

* * * * *